F. RAY.
TURBINE WATER METER.
APPLICATION FILED MAY 14, 1909.

1,005,875.

Patented Oct. 17, 1911.
2 SHEETS—SHEET 2.

WITNESSES:
James F. Duhamel
C. B. Schroeder

INVENTOR
Frederick Ray.
BY
Fred L. Casker.
ATTORNEY

UNITED STATES PATENT OFFICE.

FREDERICK RAY, OF EAST ORANGE, NEW JERSEY.

TURBINE WATER-METER.

1,005,875. Specification of Letters Patent. Patented Oct. 17, 1911.

Application filed May 14, 1909. Serial No. 495,884.

*To all whom it may concern:*

Be it known that I, FREDERICK RAY, a citizen of the United States of America, residing at East Orange, in the county of Essex and State of New Jersey, have invented certain new and useful Improvements in Turbine Water-Meters, of which the following is a specification, reference being had therein to the accompanying drawing.

This invention relates to a turbine water meter. It is of that type or class of water meters known as inferential, the volume being inferred by ascertaining and registering the velocity of the flow through a portion of the meter.

The object is to provide a measuring implement simple in its parts, accurate in its operation, and free from objectionable drop of pressure.

The invention consists essentially in the utilization of a volute type of casing, whereby the high velocity of discharge is reduced and the velocity energy transformed into pressure with scarcely any loss.

The invention also consists in various details and peculiarities in the construction, arrangement and combination of parts substantially as will be hereinafter described and claimed.

Figure 1:
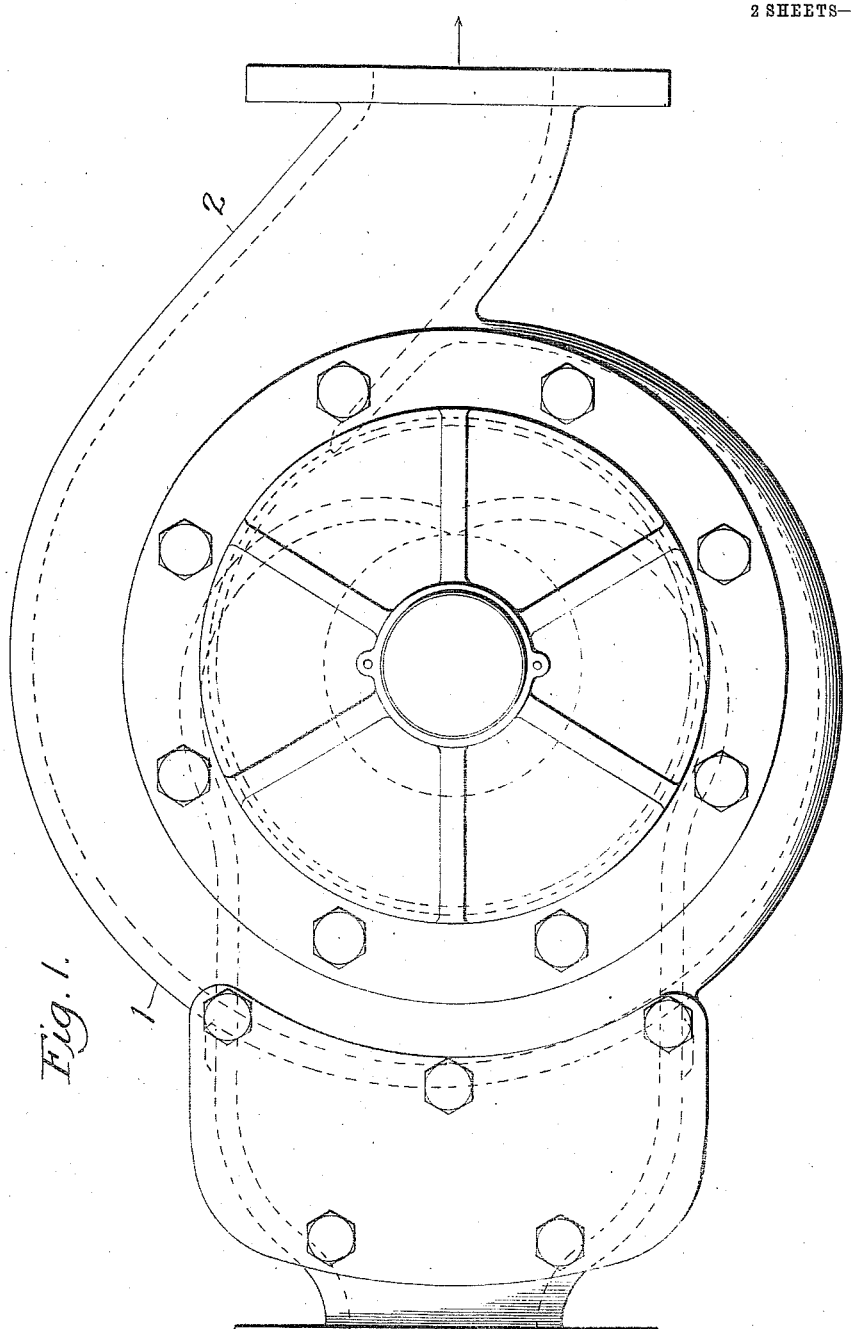
Figure 2:
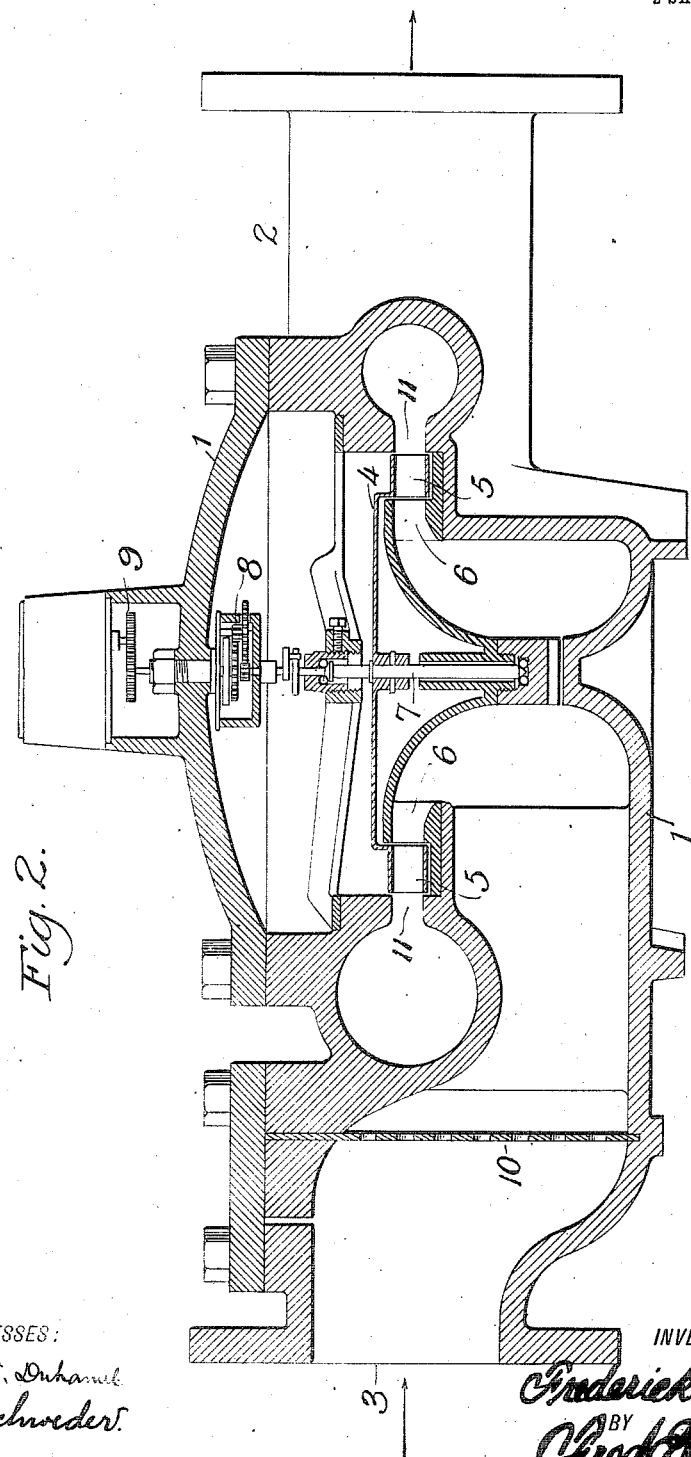

In the accompanying drawings, illustrating my invention, Figure 1 is a top plan view of my improved turbine water meter. Fig. 2 is a vertical section of the same.

Similar characters of reference designate similar parts throughout the different figures of the drawing.

1 denotes the shell or casing of the meter. This casing may be formed of any suitable material. It is shaped with a volute discharge 2, and it also has an inlet 3 which is connected with the liquid supply conduit. Within the casing is a turbine wheel 4 having wings or vanes 5, and inside of the circular series of wings or vanes 5 is a series of stationary vanes or blades 6 which, however, may be dispensed with and omitted, they being desirable though not necessary. The revolving wheel 4 is carried by a shaft 7 which actuates a gear train 8 for reducing the motion, and in turn transmitting motion to the clock gears 9 arranged in conjunction with a suitable indicating dial on which the number of revolutions is marked. The water enters through the inlet 3 and passes through the strainer 10 into the interior of the casing 1 which it fills, thus flowing through the stationary vanes 6, when they are employed, and thence through the wheel 4 and its vanes 5, whereby the turbine wheel is caused to rotate on its axis. As the turbine wheel revolves, the registering mechanism will be actuated in the ordinary manner. The discharge from the turbine wheel passes through the diffusion space 11 and thence into the volute casing 2.

The principal object in view in designing any type of meter is so to proportion the various parts that the moving element, such as the turbine wheel, will vary its rate of motion directly in proportion to the rate of flow or velocity of the fluid passing through the meter. A turbine type of meter excels other types in one respect chiefly, namely, that there is less drop in the pressure in the fluid caused by the passage of the fluid through the meter. Any such reduction in pressure represents energy wasted and is naturally undesirable in nearly all cases. The less this loss of pressure, the greater is the quantity of liquid that will flow through the meter with any given pressure on the inlet, which is also a desirable feature. The object of the volute casing, in connection with a turbine meter, is to bring about good results in both respects mentioned. As to the first, it assists by aiding in securing an even uniform flow through the meter at all velocities. It accomplishes this by reason of the fact that its shape and design are such that the water leaving the turbine wheel with a comparatively high velocity is slowed down to the velocity of the discharge without shock or eddies due to sudden change of velocity or direction. The same things which prevent irregularity of flow and consequent irregularity of registration also prevent the loss of head or pressure from shock and eddies in the fluid as it leaves the wheel.

In all types of meters, it is of great importance that they shall be able to register at very small rates of flow, and in the turbine type to accomplish this it is necessary to have some appreciable velocity through the wheel at the minimum rate of flow that is desired to be registered, the actual velocity depending upon the frictional resistance of the moving parts. It follows then that for any required flow through the wheel the actual quantity of fluid required to produce the flow will vary directly as the cross sectional area of the passage through the wheel; or, in other words, the smaller this area the smaller will be the quantity of the fluid that can be metered. It also follows that the smaller this area the greater will be the velocity with a large flow, and consequently the greater the loss of pressure will be. In a volute casing this high velocity of discharge is slowed down and the velocity energy transformed into the pressure with scarcely any loss; whereas in all other types of meters the discharge from the wheel is practically all wasted in shocks and eddies. Thus it is actually possible to design a meter with the volute casing so that it will register at very small capacities and still be capable of having a large capacity with small loss; while at the same time the registration is extremely uniform throughout the range. These advantages of a turbine meter are all attained in a very high degree in a meter constructed as represented in the drawings and as already described, wherein the water is delivered, with increased velocity, to the blades of the wheel from the center outwardly, and is taken from the wheel radially into the volute casing surrounding the chamber in which the turbine wheel rotates, the cross sectional area of which progressively and proportionately increases, as is illustrated. By delivering the water radially and outwardly to the turbine wheel, the casing can be easily and advantageously constructed at its central part to act as a nozzle to direct the water against all of the blades of the wheel at a substantially uniform pressure at all points. The volute chamber into which the water is discharged after having acted upon the blades of the wheel receives the water substantially without shock or eddies incident to the discharge from one blade meeting and opposing that from another blade of the wheel, so that while the velocity of the water leaving the wheel is reduced, there is very little fall in pressure, as compared with the pressure at the inlet 3.

Having thus described my invention, what I claim as new and desire to secure by Letters Patent, is:

1. In a turbine water meter, the combination with a supply pipe, a discharge pipe, a turbine wheel and a registering mechanism operated by the wheel, of an inclosing casing having a chamber in which the wheel turns, a volute chamber surrounding the wheel and into which it delivers, connected with the discharge pipe, and a centrally arranged water passage connected with the supply pipe, and arranged to deliver water directly to the wheel from the center outwardly.

2. In a turbine water meter, the combination with a supply pipe, a discharge pipe, a turbine wheel and a registering mechanism operated by the wheel, of an inclosing casing having a chamber in which the turbine wheel turns, a volute chamber of progressively increasing cross sectional area surrounding the chamber in which is situated the said wheel and communicating therewith, such volute chamber connecting with the discharge pipe at its large end, and a centrally arranged water passage connected with the supply pipe and arranged to deliver water directly to the wheel at an increased velocity from the center outwardly.

3. In a turbine water meter, the combination with a supply pipe, a discharge pipe, a turbine wheel and a registering mechanism operated by the wheel, of an inclosing casing having a chamber in which the wheel turns, a volute chamber surrounding the wheel and into which the water from the wheel is discharged, connected with the said discharge pipe, and centrally arranged means constructed to act as a nozzle for delivering the water radially and directly to the wheel, the said means being situated in a water passage connected with the supply pipe.

4. In a turbine water meter, the combination with a supply pipe, a discharge pipe, a turbine wheel and a registering mechanism operated by the wheel, of an inclosing casing having a chamber in which the wheel turns, a volute chamber surrounding the wheel, and a diffusion space situated between the wheel chamber and the volute chamber and connecting them, the volute chamber being connected with the discharge pipe, and a centrally arranged water passage connected with the supply pipe and arranged to deliver water to the wheel from the center outwardly.

In testimony whereof I affix my signature in presence of two witnesses.

FREDERICK RAY.

Witnesses:
FRANK PAUL,
C. B. SCHROEDER.